(12) United States Patent
Jones et al.

(10) Patent No.: US 8,235,427 B2
(45) Date of Patent: Aug. 7, 2012

(54) SELF RESTRAINED DUCTILE IRON FITTING

(75) Inventors: Jim Jones, Fort Worth, TX (US); Randall Chinchilla, San Jose (CR)

(73) Assignee: S & B Technical Products, Inc., Fort Worth, TX (US)

(*) Notice: Subject to any disclaimer, the term of this patent is extended or adjusted under 35 U.S.C. 154(b) by 133 days.

(21) Appl. No.: 12/796,422

(22) Filed: Jun. 8, 2010

(65) Prior Publication Data
US 2010/0244442 A1   Sep. 30, 2010

Related U.S. Application Data

(63) Continuation-in-part of application No. 12/493,828, filed on Jun. 29, 2009, now abandoned, which is a continuation-in-part of application No. 12/199,954, filed on Aug. 28, 2008, now Pat. No. 7,815,225, which is a continuation-in-part of application No. 12/038,544, filed on Feb. 27, 2008, now abandoned, which is a continuation-in-part of application No. 11/149,988, filed on Jun. 10, 2005, now Pat. No. 7,328,493.

(51) Int. Cl.
   *F16L 19/06* (2006.01)
(52) U.S. Cl. .......................... 285/339; 285/343
(58) Field of Classification Search .......... 285/339, 285/343, 332.1
   See application file for complete search history.

(56) References Cited

U.S. PATENT DOCUMENTS

| | | | |
|---|---|---|---|
| 3,963,298 A * | 6/1976 | Seiler | 285/231 |
| 4,818,209 A * | 4/1989 | Petersson et al. | 285/231 |
| 5,067,751 A * | 11/1991 | Walworth et al. | 285/232 |
| 5,295,697 A * | 3/1994 | Weber et al. | 285/231 |
| 5,360,218 A | 11/1994 | Percebois et al. | |
| 5,464,228 A * | 11/1995 | Weber et al. | 285/231 |
| 5,803,513 A | 9/1998 | Richardson | |
| 6,220,635 B1 * | 4/2001 | Vitel et al. | 285/337 |
| 6,945,570 B2 * | 9/2005 | Jones | 285/339 |
| 6,974,160 B2 * | 12/2005 | Jones | 285/339 |
| 7,125,054 B2 | 10/2006 | Jones | |
| 7,207,606 B2 * | 4/2007 | Owen et al. | 285/339 |
| 7,328,493 B2 | 2/2008 | Jones et al. | |
| 7,410,174 B2 | 8/2008 | Jones et al. | |
| 7,537,248 B2 | 5/2009 | Jones et al. | |
| 7,774,915 B2 * | 8/2010 | Darce et al. | 285/339 |
| 7,784,798 B2 * | 8/2010 | Walworth et al. | 285/232 |
| 7,815,225 B2 * | 10/2010 | Jones et al. | 285/339 |
| 2008/0029176 A1 | 2/2008 | Horan | |
| 2009/0060635 A1 | 3/2009 | Jones et al. | |

* cited by examiner

*Primary Examiner* — David E Bochna
(74) *Attorney, Agent, or Firm* — Charles D. Gunter, Jr.

(57) ABSTRACT

A combination sealing and restraint system for an as-cast ductile iron fitting is shown for both sealing and preventing separation of an iron pipe fitting and a mating male pipe. A ring-shaped body is installed within a mating groove provided in a mouth region of the as-cast fitting after the fitting has been cast at the manufacturing plant. The ring-shaped body is formed of an injection molded elastomeric material and carries a series of gripping segments which have teeth on an inner surface thereof which are designed to engage an outer surface of a mating male pipe. The teeth are oriented to allow movement of the male pipe in a first direction relative to an end opening of the fitting during assembly, but to resist movement in a opposite direction after the fitting joint has been assembled. The gripping segments have shelf regions which are mechanically secured to the elastomeric body of the gasket. The ring-shaped body also includes a relatively flexible portion formed of an elastomer which forms a lip seal region with the mating male pipe.

5 Claims, 7 Drawing Sheets

SELF RESTRAINED DUCTILE IRON FITTING

CROSS-REFERENCE TO RELATED APPLICATIONS

The present application is a continuation-in-part of Applicant's prior U.S. application Ser. No. 12/493,828, filed Jun. 29, 2009, entitled "Self-Restrained Ductile Iron Fitting", now abandoned, which was a continuation-in-part of Applicant's prior U.S. application Ser. No. 12/199,954, filed Aug. 28, 2008, entitled "Self-Restrained Ductile Iron Fitting", now issued U.S. Pat. No. 7,815,225, issued Oct. 19, 2010, which was a continuation-in-part of Applicant's prior U.S. application Ser. No. 12/038,544, filed Feb. 27, 2008, entitled "Self-Restrained Ductile Iron Fitting," now abandoned, which was, in turn, a continuation-in-part of Ser. No. 11/149,988, filed Jun. 10, 2005, entitled "Self Restrained Fitting for PVC and Ductile Iron Pipe", now issued U.S. Pat. No. 7,328,493, issued Feb. 12, 2008.

BACKGROUND OF THE INVENTION

1. Field of the Invention

The present invention relates generally to the field of pipe connections for sections of pipe such as those pipes used in the municipal water and sewer pipeline industries. More particularly, this invention relates to a combination sealing and restraint system for use in "as-cast" ductile iron pipeline systems, as well as with PVC and HDPS pipeline systems.

2. Description of the Prior Art

Pipes are commonly used for the conveyance of fluids under pressure, as in city water lines. They may also be used as free-flowing conduits running partly full, as in drains and sewers. Pipes for conveying water in appreciable quantities have been made of steel, cast iron, concrete, vitrified clay, and most recently, plastic including the various polyolefins and PVC. Ductile Iron is a high strength, tough material which has traditionally been used in water and wastewater systems in all 50 states of the United States and in many other areas of the world. In the United States alone, it has been in continuous use in hundreds of municipal utility systems for more than a century.

While the instant application deals generally with ductile iron "fittings" in one preferred form it will be understood that the "pipe" being coupled to the fitting may be ductile iron. However, the "pipe" being joined can also be a plastic or polyolefin, such as polyvinyl chloride (PVC), high density polyethylene (HDPE), or any other pipe material commonly used in the industry. All of the types of pipeline materials will be referred to collectively as "pipe in the discussion which follows.

In many applications where lengths of pipe are joined in telescoping relationship, the spigot end of one pipe is inserted into the socket end of the engaging pipe at a pipe joint or "coupling." The socket end has an opening large enough to receive the spigot end of the mating pipe. A gasket is typically present within the socket end of the pipe which is intended to prevent leakage of fluid from the joint by forming a seal between the two pipe sections. Piping systems of the above type also typically include "fittings" as that term is defined in the industry. A fitting is a term which will be familiar to those in the relevant industries and includes a piece, often curved or at an angle, as a coupling, an elbow, a valve, a Tee, etc. used for connecting lengths of pipe or as an accessory to a pipe in a piping system for conveying fluids. Exemplary "as cast" ductile iron pipe fittings are shown, for example, in the Tyler/Union Utilities Mini-Catalogue, May 2001, on pages 2-3, as the "Mechanical Joint C153 Ductile Iron Compact Fittings." These fittings are merely intended to be exemplary, as there are a number of other commercial sources for such pipe fittings.

In addition to pipes and fittings, there are other components in a pipeline system which are placed in fluid communication with a length of pipe, requiring a sealed coupling or joint. For example, there are hydrant tees and valves which are commonly used in most municipal water systems. As an example of such components, American AVK is a leading manufacturer of gate valves, fire hydrants, and accessories for the water, wastewater, fire protection, and irrigation industries and company catalogues illustrate a variety of these general types of products.

One important consideration in piping systems of the above type, whether in a straight run of pipe or at a fitting, is to provide adequate sealing at the pipe joints or couplings. In addition to the necessity of providing effective sealing, another important design requirement exists when it becomes necessary to join the pipe components in a restrained manner. This is usually desired in order to prevent the pipe components from separating due to thrust forces that often occur when the pipeline is subjected to internal or external pressures, changes in direction or elevation of the pipeline, and sometimes when earthquakes or tremors or other external factors come into play.

Thus, in a straight section of a pipe, the hydrostatic forces are generally balanced. Wherever the pipeline changes direction or diameter, such as at a bend, tee or a reducer, however, the hydrostatic forces create an unbalanced thrust force in the line. This unbalanced thrust force can cause the line to move or its joints to separate unless the thrust force is counterbalanced in some manner. Where there are only gradual changes of direction in the line, the lateral thrust forces are normally counterbalanced by the friction between the pipe and the soil along the length of piping, and joint restraint is not normally required. However, when higher pressures, poor soil conditions or significant changes of direction or diameter are encountered, the thrust forces may be too great to be resisted by the soil surrounding an unrestrained joint. In the past, these unbalanced thrust forces have commonly been counterbalanced with thrust blocks, restrained pipe joints, or a combination of the two.

One of the most common devices for forming a "restrained" sealed joint in straight runs of pipe referred to above is the "mechanical joint" or "MJ". There, the bell end of an iron pipe section has a cast-on flanged portion on the pipe exterior. The spigot end of a second iron pipe is fitted with a slidable gland fitting and a gasket that is conically shaped such that one face of the gasket is diametrically larger than the second face of the gasket. The conically shaped gasket is positioned between the gland fitting and the spigot end of the pipe with the smaller, second face of the gasket being closer to the spigot end than the larger, first face of the gasket. The gland fitting has a plurality of apertures for receiving standard bolts. The joint is formed when the spigot is axially inserted into the bell, and the gland fitting and the flanged portion are bolted together, causing the lip of the gland fitting to compress the gasket thus sealing the two pipe pieces.

While the "internal" gasket used in the traditional MJ design for ductile iron pipe served to seal the joint, the gasket did not feature a cooperating "restraint" feature in order to assure the greater integrity of the joint of pipe. Instead, it was necessary to utilize a cumbersome external mechanical restraint system made up of the flange, bolts, screws, etc., as discussed above. Also, when the pipe component being joined was a fitting rather than a straight run of pipe, there was less room available on the exterior of the fitting to accept the various parts (flanges, bolts, screws, etc.) that were necessary to make up the MJ type restraint.

In order to meet the need for a restrained joint of the above type, a number of companies in the industry have worked to develop various forms of restrained joint products for pipelines of the type under consideration. Some of these solutions have been provided of both the "push-on" type joints, as well as the traditional bolted mechanical joints. These include, for example, the FAST-GRIP® and TR FLEX® restrained push-on joints, the FIELD LOK 350® gaskets used to restrain push-on TYTON®JOINTS, and the more recent MJ FIELD LOK® gaskets which are used to restrain mechanical joint pipe and fittings.

The Ductile Iron Pipe Research Association (DIPRA) has published the "Thrust Restraint Design for Ductile Iron Pipe," a document of conservative design guidelines for the restraint of thrust forces in underground, pressurized, Ductile Iron piping systems. The DIPRA procedures are based on accepted principles of soil mechanics and provide formulas for determining thrust forces and the necessary restraint.

Thus, in spite of improvements in pipeline systems generally, a need continues to exist for an improved sealing and restraint system, particularly for ductile iron fittings, of the type which offers complimentary sealing and self-restraining features.

A need also exists for such a system which is cost-effective, easy to manufacture and easy to use in the field and which is dependable in operation.

A need also exists for such a system which effectively restrains pipe at fittings, as well as hydrant tees and valves, against internal and external forces without the need for an external flange, bolts or associated restraining screw mechanisms.

A need exists, accordingly, for a sealing and restraint system for pipe, and particularly for ductile iron fittings, which offers complimentary sealing and self restraining features in an internal sealing/restraint system.

SUMMARY OF THE INVENTION

The present invention has as one object to provide a combination sealing and restraint system for insertion within an annular groove within a mouth region located adjacent an end opening of an as-cast ductile iron fitting capable of both sealing and restraining the ductile iron fitting to a mating male pipe having an interior surface and an exterior surface.

In one form, the combination sealing and restraint system includes an annular gasket body made of a resilient elastomeric material, the annular gasket body having an inner circumferential region and an outer circumferential region. When installed within the annular groove provided in the mouth region of the as-cast fitting, the outer circumferential region forms a seal with the fitting mouth region and the inner circumferential region forms a sealing surface for a mating male pipe section. A plurality of gripping segments extend outwardly from the nose region of the annular gasket body at an inclined angle with respect to the horizontal axis of the mouth region of the pipe and at a predetermined spacing around the circumference of the annular gasket body. Each of the gripping segments has an inner planar surface and an outer planar surface separated by a thickness. The inner planar surface has at least one row of gripping teeth capable of engaging selected points on the exterior surface of the mating male pipe. The gripping segments are separated by flexible rubber extension regions of the remaining gasket body.

In one form of the invention, the annular gasket body, when viewed in cross section, includes a leading nose region and a radially inwardly slanting sealing surface which forms a lip seal for engaging the mating male pipe end during insertion. The gripping segments may be integrally formed into the leading nose region of the annular gasket body during manufacture of the gasket body. For example, the gasket body may be injection molded with the gripping segments being integrally formed into the gasket body during the injection molding operation.

In one version of the invention, the gripping segments have engagement openings or recesses which are filled with rubber during the gasket manufacturing process, allowing the gripping segments to be mechanically secured to the gasket body, either permanently or temporarily. For example, the gripping segments may have holes formed therein so that, during the injection molding process for the gasket, the rubber flows through the holes and mechanically attaches the segments to the elastomeric body portion of the gasket. A front region of each gripping segment has an additional tapered surface which acts as a positive stop in cooperation with a similar stop region provided in the gasket pocket of the fitting. The gripping segments have a given width, with the segments being spaced apart by a predetermined distance, the distance being filled by the aforementioned flexible extension regions of the gasket body. In one preferred form of the invention, a plurality of rows of gripping teeth are present on the inner planar surface of the gripping segments. Where two or more rows are present, one row will preferably have a greater relative height than the other rows.

A method is also provided for forming a pipe joint with the sealing and restraining system described above. To begin, a fluid piping system is provided which has one or more as-cast ductile iron pipe fitting, previously cast at a foundry, each having a mouth region adjacent an end opening thereof. The mouth region has an annular groove therein, and the end opening of the fitting is sized to receive a mating male pipe having an interior surface and an exterior surface. In a post-casting operation, the sealing and restraining system is installed within the annular groove provided in the end opening of the as-cast fitting. A mating male pipe is installed within the end opening of the mouth region of the as-cast fitting by pushing the male pipe within the end opening, and the sealing and restraint system contacts the external surface of the mating male pipe in order to both seal and restrain the mating male pipe and form a secure joint.

Although the sealing and restraint system has special applicability for joining sections of PVC pipe, the mating male pipe sections can also be formed of other conventional materials such as ductile iron or polyethylene. The sealing and restraint system of the invention also works with any conventional size of pipe, whether metric, Imperial, IPS size range, etc.

Additional objects, features and advantages will be apparent in the written description which follows.

DETAILED DESCRIPTION OF THE INVENTION

Figure 1:
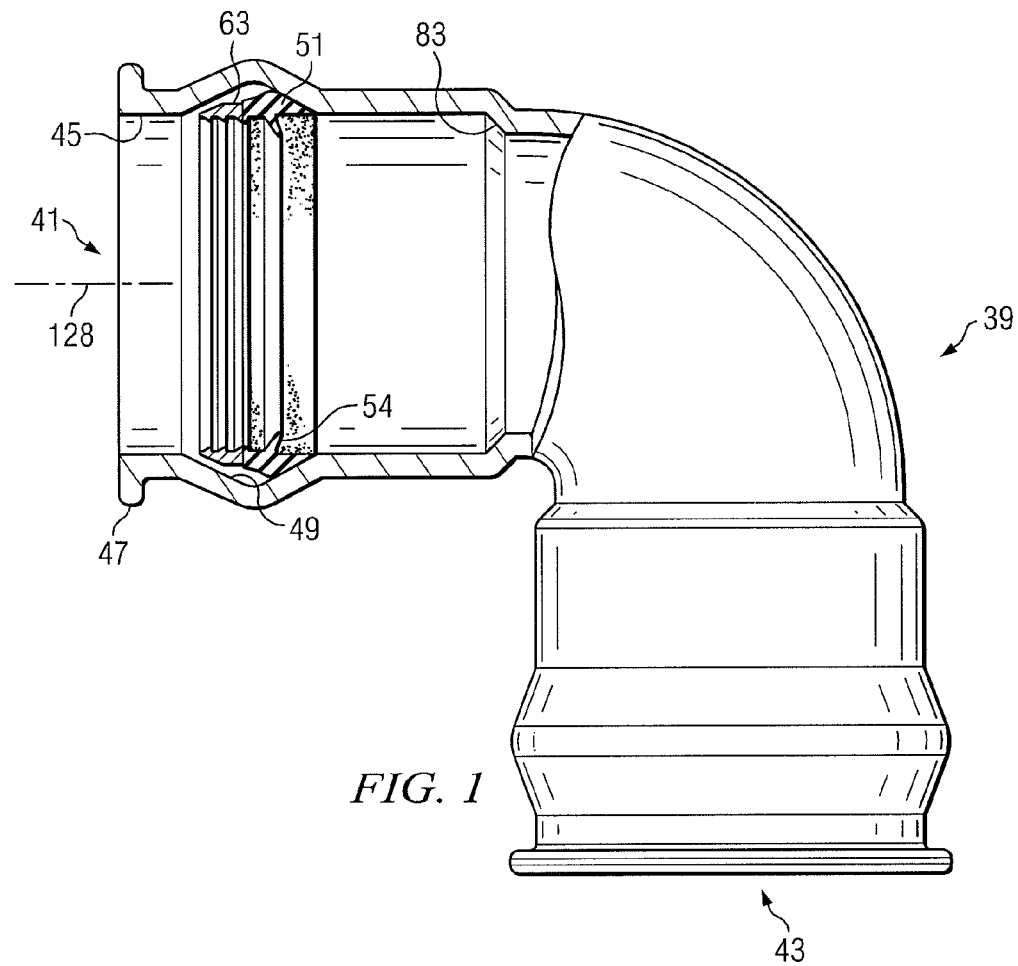
FIG. 1 is a perspective view, partly broken away, of an as-cast ductile iron pipe fitting showing one version of the combination sealing and restraint system of the invention in place within a mouth region of the fitting.

The present invention deals with piping systems of the type used in water, sewage and other municipal fluid conveyance systems. In the past, such pipelines were traditionally formed of a ferrous metal. By "ferrous metal" is meant iron and alloys of iron. For example, one type of ferrous metal which is commonly encountered in the water works industry is "ductile iron." This particular type of metal is widely used because it offers a combination of a wide range of high strength, wear resistance, fatigue resistance, toughness and ductility in addition to the well-known advantages of cast iron-castability, machineability, damping properties and economy of production. It takes its name from the fact that it is "ductile" in nature, rather than being brittle, as was the case with earlier cast iron products and materials. Today, grades of ductile iron are available offering the option of choosing high ductility with grades guaranteeing more than 18% elongation, or high strength, with tensile strengths exceeding 120 ksi (825 MPa). Austempered ductile iron (ADI), offers even greater mechanical properties and wear resistance, providing tensile strengths exceeding 230 ksi (1600 Mpa).

In forming a pipeline of ductile iron components, one end of each section is typically enlarged, forming a "bell" at one end sufficient to join the next adjacent pipe section by receiving in the belled end the unenlarged or "spigot" end of the next adjacent length of pipe within the bell end opening. The inside diameter of the bell is formed sufficiently large to receive the spigot of the next section of pipe with sufficient clearance to allow the application of an elastomeric gasket or other sealing device designed to prevent leakage at pipe joints when a plurality of pipe lengths are joined to form a pipeline.

Straight runs of ductile iron pipe of the above type have, for many years, been joined by utilizing an elastomeric gasket which is compressed between the inside walls of the bell and the outside wall of a mating spigot end of the next pipe in a series of telescoped pipes. The gasket is typically retained within the groove provided in the bell end opening of the female pipe section. However, as discussed above, one problem which exists is finding a way to "restrain" the assembled pipe joints so that the joint will not be separated due to internal or external pressure, or due to environmental factors such as earth movement.

As mentioned in the background discussion of the invention, the pipe industry has generally addressed the problem of providing a "restrained joint" by utilizing an external sealing "gland" or flange, sometimes referred to as a "mechanical joint" or simply as an "MJ". The MJ style restraint has worked satisfactorily in the past on straight runs of pipe. However, fittings typically do not present as large an exterior surface for receiving the various components needed to make up the MJ type restraint. Also, an internal combination sealing and restraint system would offer greater ease and speed of assembly in the field. Because the gripping components would be internal rather than external, there would be less opportunity for corrosion of the metallic components in use.

Figure 5:
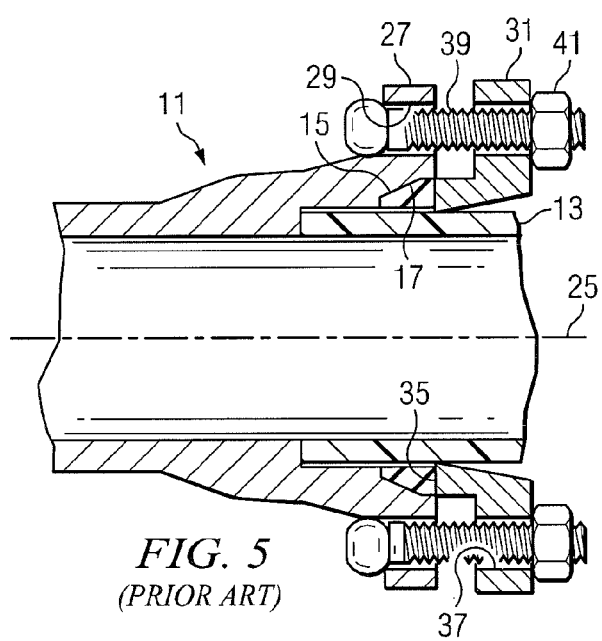
FIG. 5 is a partial sectional view of a prior art MJ style pipe coupling system.

Turning to FIG. 5, there is shown a typical mechanical joint, or "MJ", of the prior art. The joint shown in FIG. 5 is formed between a pipe bell end 11 of one ductile iron pipe and the plain spigot end 13 of a second mating pipe. The second pipe 13 is inserted into the belled end 11 of the enclosing pipe. The inner surface of the pipe bell end 11 has a retainer groove 17 for retaining a gasket 15. The belled pipe end 11 also has a flanged region 27 which includes a plurality of apertures 29. A circumferential gland 31 is sized to be received about an outer surface of the mating male ductile iron pipe. The gland 31 has a forward lip portion 35 which contacts and compresses the body of the gasket 15 as the joint is assembled. The gland 31 also has a plurality of apertures 37 which are arranged to be aligned with the apertures in the flange collar region of the bell pipe end. Bolts 39 and nuts 41 are used to join the apertures of the bell pipe end and the gland as shown in FIG. 5.

While the mechanical joint illustrated in FIG. 5 has been utilized for a number of years in the industry, it is somewhat cumbersome and time consuming to assemble. Additionally, the external metallic components are subject to wear, damage and corrosion. As mentioned above, it may be too bulky for use on some fittings. The present invention, therefore, has particular application to as-cast "fittings" which are used to make up a joint between two plain end pipe sections. By "as-cast" is meant that no additional machining is involved to form the bell, as with traditional systems. Traditional "as-cast fittings" of the general type under consideration are commercially available from a number of sources, for example, the Tyler Pipe/Utilities Division of Union Foundry Company located in Anniston, Ala., as previously mentioned in the Background discussion.

As has been briefly mentioned, in the discussion which follows, the invention may be described with reference to ductile iron pipelines where one length of ductile iron pipe is being joined to a subsequent length of ductile iron pipe and where both pieces of pipe are formed of iron. However, the principles of the present invention have particular applicability to those "hybrid" systems in which the mating male pipe could also be formed of another material, such as a suitable plastic. For example, the mating male plastic pipe might be formed from PVC or a suitable polyolefin such as polyethylene, or might even be a molecularly oriented plastic material.

Such "hybrid" systems, particularly those joining plastic pipe to ductile iron fittings, are becoming increasingly common in use in the rehabilitation of existing ductile iron pipe lines.

In the discussion which follows, the terms "pipe" and "pipe/fitting" are intended to cover, in addition to pipes and fittings of the type described, other components in a pipeline system which are placed in fluid communication with a length of pipe, requiring a sealed coupling or joint. For example, there are hydrant tees and valves which are commonly used in most municipal water systems. As has been mentioned, American AVK is a leading manufacturer of gate valves, fire hydrants, and accessories for the water, wastewater, fire protection, and irrigation industries and company catalogues illustrate a variety of these general types of products.

FIG. 1 illustrates an as-cast ductile iron elbow fitting which has installed therein one version of a combination sealing and gripping restraint system of the type under consideration. The as-cast fitting 39 illustrated in FIG. 1 has opposing end openings 41, 43. Each end opening has an adjacent mouth region (45 in FIG. 1) and can be provided with a slight upset 47. It is not necessary that the upset 47 be provided as an apertured flange, however, as with the prior art "MJ" systems. An annular groove 49 is provided within the mouth region 45 slightly spaced back from the end opening 41.

Figure 4:
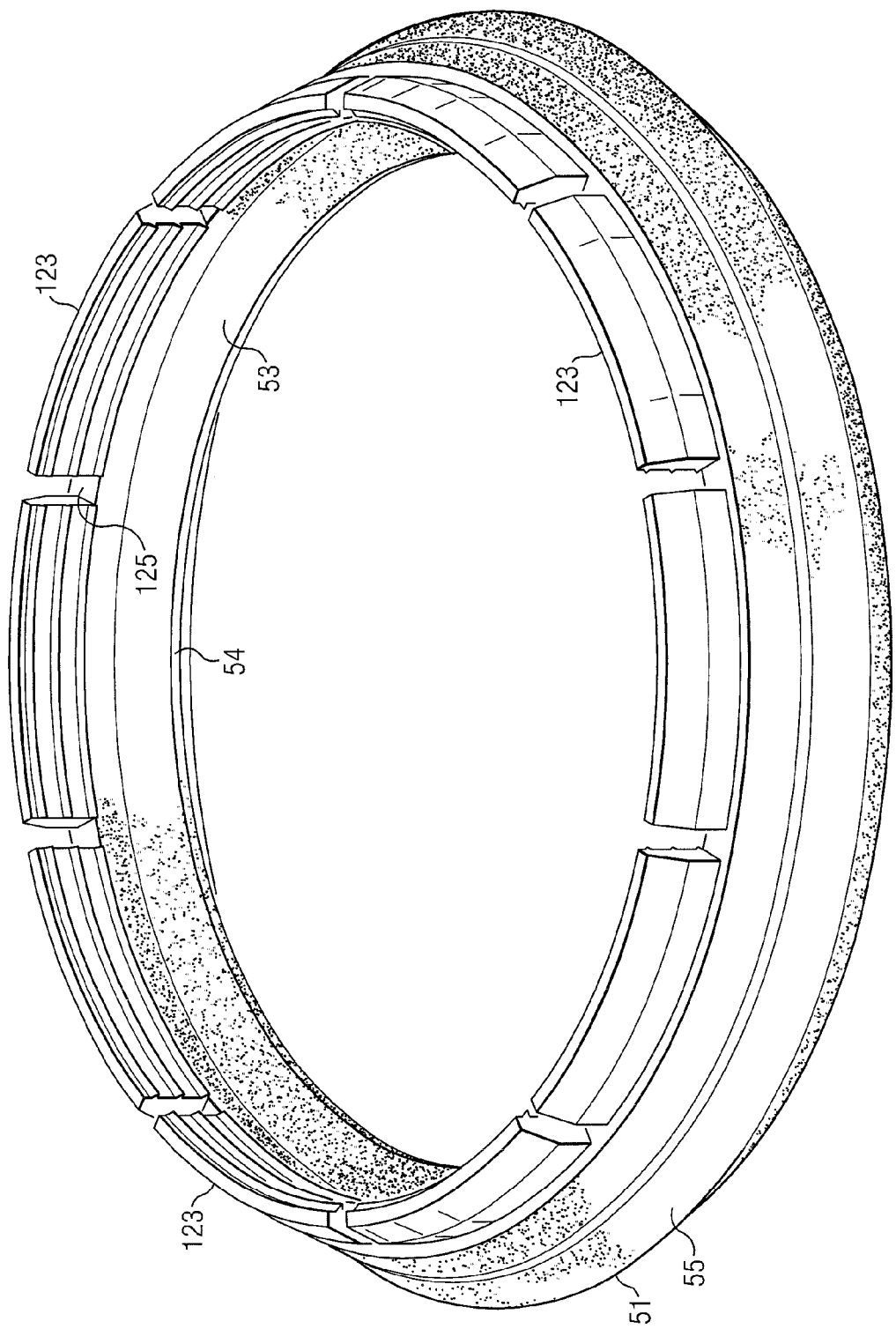
FIG. 4 is a perspective view of the combination sealing and restraint system used in the ductile iron fitting of FIG. 1.

The combination sealing and restraint system shown in FIG. 1 includes an annular gasket body 51 (FIG. 1) having an inner circumferential region 53 and outer circumferential region 55 (see FIG. 4). The annular gasket body 51 (FIG. 1) is installed within the annular groove 49 provided in the mouth region 45 of the as-cast fitting so that the outer circumferential region 55 forms a seal with the fitting mouth region and the inner circumferential region 53 forms a sealing surface for a mating male pipe section. The lip region 54 of the inner circumferential region 53 forms a primary lip seal for engaging the mating male pipe end during insertion.

FIGS. 1-4 illustrate a first evolution of the combination sealing and restraint system under consideration. Turning to FIG. 3B, the combination sealing and restraint system includes the previously described sealing gasket body, designated generally as 101, together with an integral restraint system. The gasket portion of the device (indicated generally at 101 in FIG. 3B) includes a leading nose region 103 which is joined to a radially inwardly slanting sealing surface 105. The inwardly slanting sealing surface 105 extends outwardly to form a lip seal region 107 for engaging the mating male pipe end during insertion. Whether the gasket body features a lip seal, as shown in FIG. 3B, or more of a bulbous "compression seal region", the sealing surface of the gasket body will generally extend further radially inward (toward the centerline of the pipe) than the gripping surfaces of the companion gripping segments (123 in FIG. 3B).

The lip seal region 107 of the gasket body is joined to a secondary sealing surface 111. The secondary sealing surface 111 comprises a generally planar circumferential region 113 which terminates in an inside corner 115 of the gasket. The inside corner 115 is connected to an outer arcuate region 117 of the gasket by a gently sloping exterior gasket surface 119. The outer arcuate region 117 of the gasket is connected to the nose region 103 of the gasket by a downwardly sloping external gasket surface 121.

A plurality of integrally formed gripping segments 123 (see FIG. 4) extend generally perpendicularly outward from the nose region 103 (FIG. 3B) of the annular gasket body 101 at a predetermined spacing around the circumference of the annular gasket body 101. By "extending generally perpendicularly outward" is meant that the segments extend generally along an axis generally parallel with the inside corner 115 of the gasket body and generally parallel to the longitudinal axis of the pipe (illustrated as 81 in FIG. 3B). In the example shown, there are ten evenly spaced gripping segments. The gripping segments are typically formed of a metal such as iron or steel, although the segments might be formed of a hard plastic where the mating male pipe to be gripped is formed of, for example, PVC. The number of gripping segments will vary depending upon the diameter of the sealing and gripping assembly. For example, in the case where the annular gasket body 101 has a six-inch diameter, nine separate gripping segments 123 will typically extend outwardly around the circumference of the gasket body 101. The gripping segments 123 are generally planar with a length, a width, an inner circumferential surface and an outer circumferential surface separated by a thickness. There exists a series of generally uniform gaps or spaces (generally shown at location 125 in FIG. 4) between each adjacent gripping segment. The gaps 125 between the metallic gripping segments 123 provide some degree of flexibility for the assembly, thereby facilitating its installation within the mouth region 41 of the pipe fitting 39. In some forms of the invention, the gaps 125 may be filled with rubber which is extruded as a part of the sealing gasket body, as well.

The gripping segments are preferably integrally formed into the leading nose region of the annular gasket body during manufacture of the gasket body. For example, the gasket body may be injection molded with the gripping segments being integrally formed into the gasket body during the injection molding operation. In that event, a portion of the length of the gripping segments would be enclosed within or be embedded within the elastomeric body of the sealing gasket. Alternatively, it may be possible to glue or otherwise adhere the gripping segments to the elastomeric gasket body in some circumstances so that the segments are held in the position shown in FIG. 4.

Figure 3A:
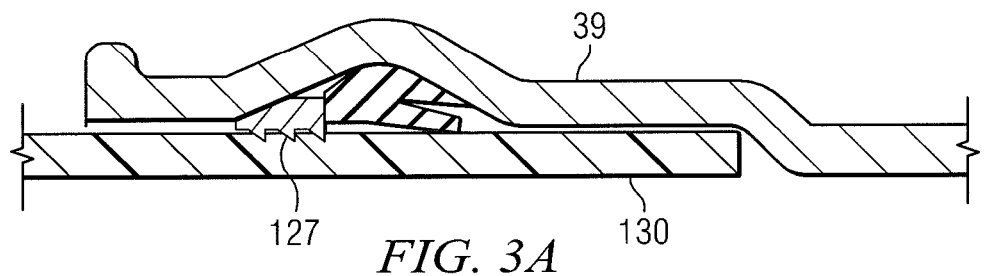
FIG. 3A is a partial, sectional view of one end of the pipe fitting of FIG. 1, illustrating the assembly of the male pipe end.
Figure 3B:
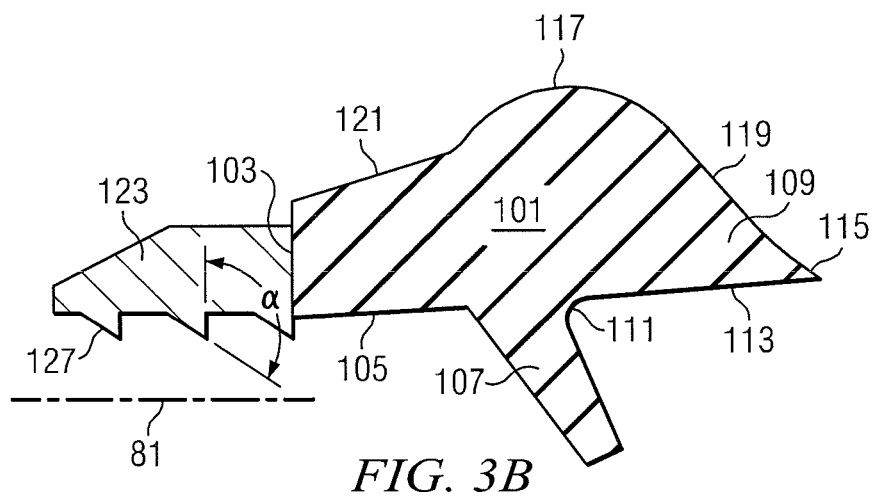
FIG. 3B is a sectional view of the combination sealing and restraint system of FIG. 3A.

The inner planar surface of each gripping segment 123 has at least one row of teeth 127 capable of engaging selected points on the exterior surface of the mating male pipe. In the version of the device illustrated in FIG. 3B, there are three rows of teeth 127 on the inner planar surface. As illustrated in FIG. 3B, the teeth are formed on an acute angle "a" with respect to the pipe horizontal axis (illustrated as 81 in FIG. 3B) of the mouth opening 45 once assembled within the as-cast fitting 39. The shape and inclined angle of the teeth allow a mating male pipe end to be received within the end opening 41 of the fitting 39 and move in a direction from left to right as viewed in FIG. 3A. However, the shape and inclined angle of the teeth 127 resist opposite relative movement of the mating male pipe 130 and thereby exert a restraining force on the mating male pipe 130 once the male pipe has be fully inserted into the fitting 39.

Figure 2:
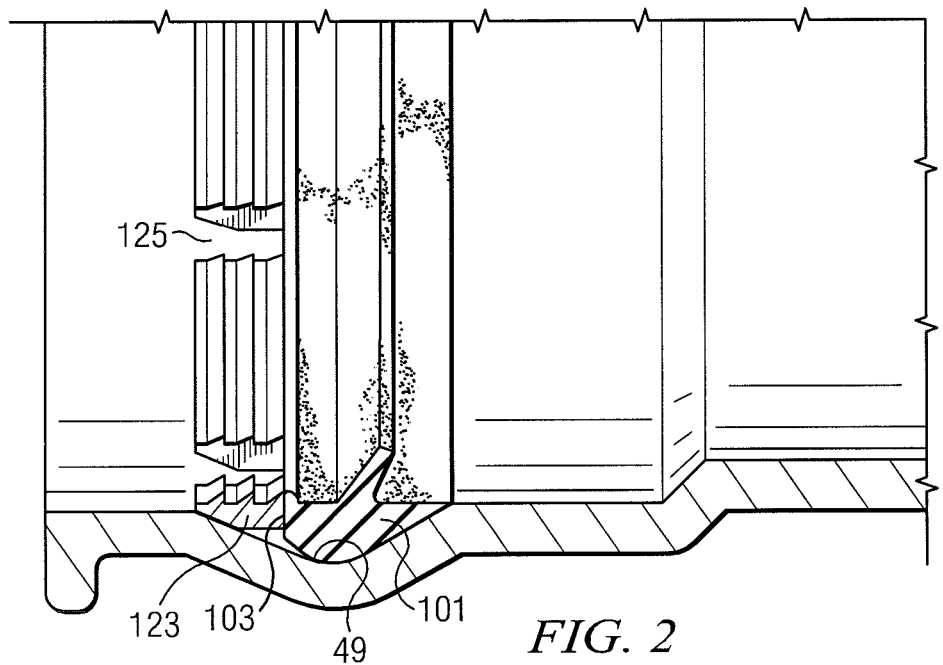
FIG. 2 is a partial sectional view of one end of the ductile iron pipe of FIG. 1 showing the combination sealing and restraint system thereof in greater detail.

FIG. 2 provides an enlarged quarter-sectional view of one end of the ductile iron pipe of FIG. 1, specifically showing the combination sealing and restraint system thereof in greater detail. The annular gasket body 101 of the sealing and restraint system is shown installed within the annular groove 49 provided in the mouth region of the as-cast fitting. The gripping segments 123 extend outwardly from the nose region 103 of the annular gasket body 101. As mentioned, there is a slight space between each gripping segment, as shown at location 125 which is either open, or which is filled with rubber.

As has been mentioned, the mating male pipe may be made from a plastic material, such as from PVC, or from iron. In the case where the mating male pipe is formed of iron, the gripping segments are preferably formed of ductile iron or hardened steel which has been treated to at least about 370-440

Brinell hardness (BHN) so that the gripping teeth of the segments can penetrate the mating male iron pipe exterior surface or form a buttress on the pipe surface.

Figure 6:
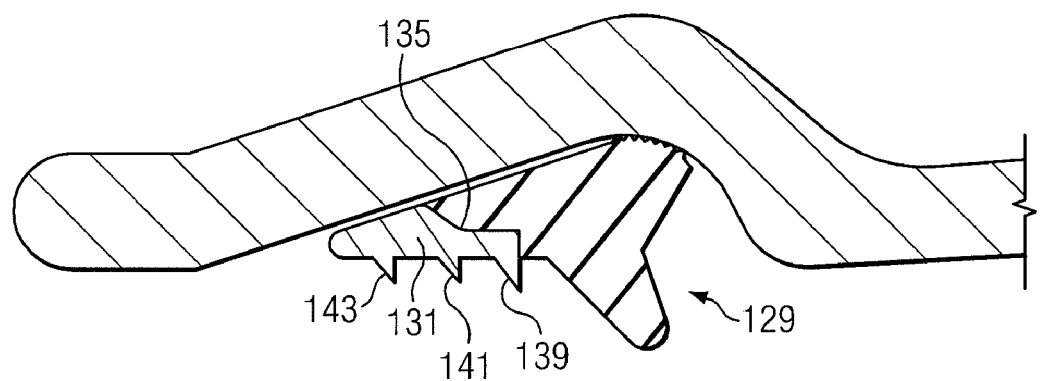
FIG. 6 is a side, partial sectional view which shows another form of the sealing and restraint system of the invention in which the rubber of the nose region of the gasket partially covers the outer planar surface of a series of gripping elements.
Figure 7:
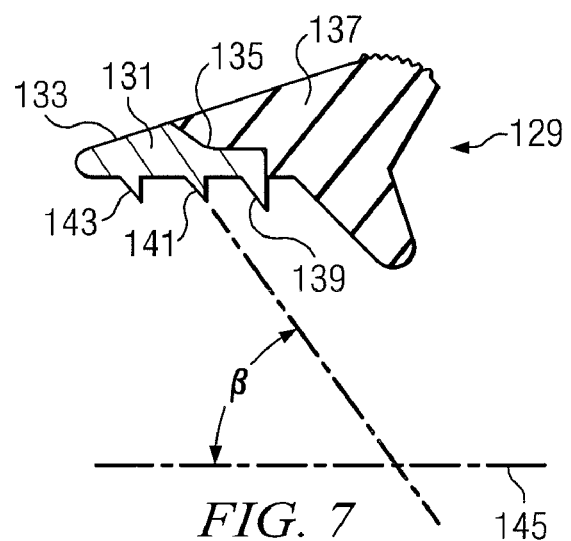
FIG. 7 is an isolated, cross-sectional view of the sealing and restraint system used in FIG. 6 showing the angle of the gripping teeth on the inner planar surface of the gripping segments.

FIGS. 6 and 7 show a further evolution of the sealing and restraint system of the invention, designated generally as 129. The sealing and restraint system 129 is generally similar to that which has been previously described with respect to FIGS. 1-4. However, as best appreciated from the isolated view of FIG. 7, it will be seen that the gripping segments 131 have a ramped exterior region 135 on their rear extents which is made up of a horizontal portion joined to an angularly sloped portion, the region 135 having at least a slight covering of rubber material. This is conveniently achieved as a part of the injection molding process of the elastomer portion 137. By providing a rubber covering layer on the outer planar surface of the gripping segments, the force which the teeth (139, 141 in FIG. 6) apply to the mating male pipe end can be more fully controlled. In other words, the amount of rubber present on the outer planar surfaces 135 and the durometer of the rubber will determine the amount of ultimate force which the combined sealing and restraint system applies to the mating male pipe. The ramped exterior region 135 is joined to a downwardly sloping exterior surface (133 in FIG. 7) which terminates in a leading nose region of the gripping segment. It will be noted that the downwardly sloping exterior surface 133 is free of rubber.

In the version of the restraint system shown in FIGS. 6 and 7, the rubber region which extends from the elastomer portion 137 is a continuous ring shape with a recess being formed on an interior surface thereof for receiving the gripping segments 131. With further reference to FIGS. 6 and 7, the gripping segments 131 are formed with three rows of gripping teeth 139, 141, 143. Note that the teeth may be provided with a slight "hook" or backward angle "β" with respect to the central axis 145 of the female belled pipe end. In other words, the angle "β" is not perpendicular to the longitudinal axis 145. Where the gripping elements have more than one row of teeth, one row will typically be taller, i.e., have a greater radial height, than the other rows. For example, in FIGS. 6 and 7, the inner row 139 is slightly taller, i.e., of greater relative height, than rows 141 and 143, respectfully.

The gripping segments 131 of the invention are also preferably coated with a low-coefficient of friction synthetic coating. The preferred top coat which is applied to the gripping segments is a synthetic polymeric coating. The selected synthetic polymer is preferably thermoplastic and can be selected from such materials as polyvinyl chloride, fluoroplastic polymers, nylon, and the like, depending upon the end application of the pipe joint. The preferred coatings are fluoroplastic polymers, sometimes referred to as "fluoroelastomers." These materials are a class of paraffinic polymers that have some or all of the hydrogen replaced by fluorine. They include polytetrafluoroethylene, fluorinated ethylene propylene copolymer, perfluoroalkoxy resin, polychloro-trifluoroethylene copolymer, ethylene-tetra-fluoroethylene copolymer, polyvinylidene fluoride and polyvinyl fluoride. Fluoroplastics have a low coefficient of friction, especially the perfluorinated resins, giving them unique nonadhesive and self lubricating surface qualities.

For example, the coating can be an AquaArmor® inner coat to which is applied a top coat of a suitable synthetic polymer. Coating of the ring could not be done if the ring was cast into the body of the bell at the foundry. The AquaArmor® coating is described in patent publication no. 20070196585, "Method of Applying a Phenolic Resin Corrosion Protective Coating to a Steel Component", published Aug. 23, 2007. There, a method is shown for corrosion protecting both ductile iron and steel components in which a surface of the component is coated with a corrosion resistant coating which is an aqueous phenolic resin dispersion. The component is dipped in a bath of the corrosion resistant coating and then baked, dried and cooled. An electrostatic powder coating can be applied over the base phenolic resin coating for added corrosion protection and durability.

Another preferred polymer for the top coat is polytetrafluoroethylene (PTFE). This material is a completely fluorinated polymer manufactured by free radical polymerization of tetrafluoroethylene. With a linear molecular structure of repeating —CF2-CF3-units, PTFE is a crystalline polymer with a melting point of 327 degrees C. Density is 2.13 to 2.19 g/cc. PTFE's coefficient of friction is lower than almost any other known material. It is available in granular, fine powder (e.g., 0.2 micron), and water based dispersion forms. In the United States, PTFE is sold as "TEFLON"® by Du Pont de Nemours Co.

Another preferred polymer for the top coat is a Xylan® coating, supplied by Whitford Corp. This coating is available from a number of commercial sources. It has the following published characteristics:

| | |
|---|---|
| Tensile Strength ASTM D1708 | 4000-5000 psi |
| Elongation ASTM 1457 | 50% |
| Impact Strength ASTM D256 | 13 ft-lb/in |
| Hardness ASTM D2240 | 60-90 HB shore D |
| Abrasion Resistance, Tabor | >15 mg |
| Coefficient of Friction ASTM D1894 | .15-.35 static |
| Dielectric Strength ASTM D149 | 1400 volts per mil |
| Use Temperature | −100° F. to 500° F. max |
| Melting point | n/a |
| Thermal conductivity | n/a |
| Chemical Resistance ASTM D543 | good |
| Salt Spray Resistance ASTM B117 | excellent |
| Water Absorption ASTM D570 | <.03% |
| Thickness | .0008" to .002" |

This non-stick, anti-friction coating can be applied by spraying on with a spray gun, followed by heating to fix or cure the coating. The techniques used can vary from conventional air atomized spray coating using a spray gun to such techniques as electrostatic deposition, however. The metal parts receiving the coating should be free of dirt, oil and other contaminants that could interfere with the coating adhering to the metal. The coating is typically applied by an air spray gun to a mil thickness of about 0.8 to 1.1 mils. It is recommended that the coating be baked to the metal ring to get the optimum physical properties.

The dry powders can also have a color additive, such as a suitable pigment, dispersed therein which impart a distinctive color to the coated ring component of the gasket. Color markings of this type can be used, for example, for product identification purposes.

Figure 9:
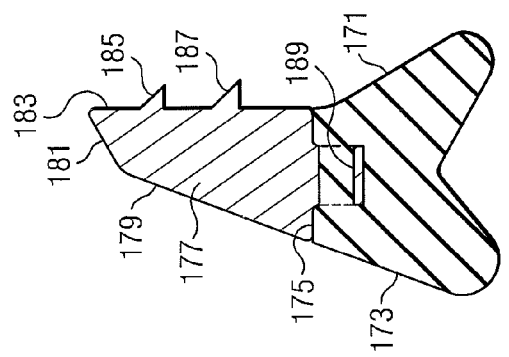
FIG. 9 is a cross-sectional view of the sealing and restraint system of FIG. 8.
Figure 8:
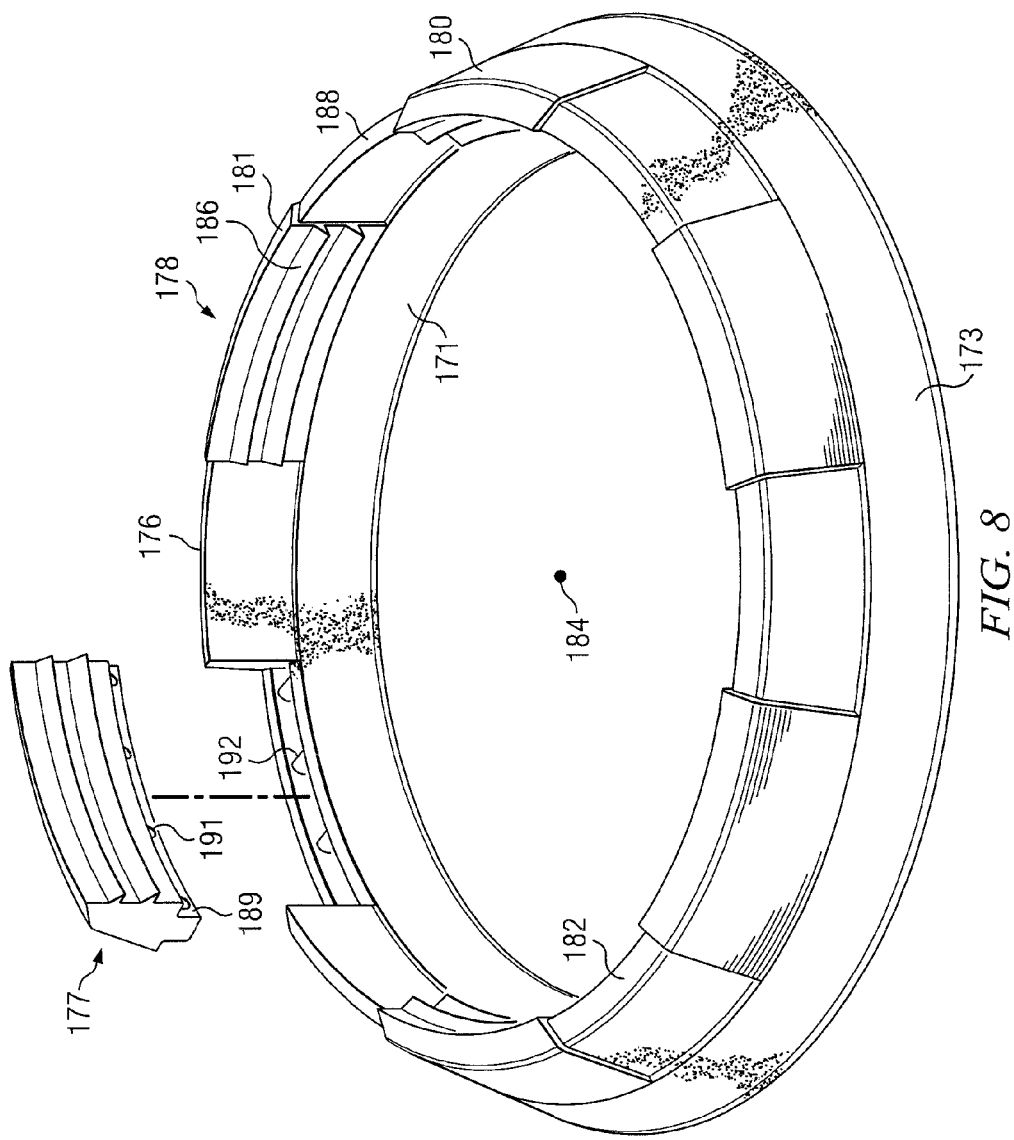
FIG. 8 is a perspective view of a particularly preferred version of the sealing and restraint system of the invention with one of the gripping segments of the system being shown in exploded fashion.

FIGS. 8 and 9 of the drawings show a final evolution of the sealing and restraint system of the invention. With reference to FIGS. 8 and 9, the gasket body again has an inner circumferential sealing region 171 which forms a lip seal with the male pipe end. The gasket body also has an outer circumferential region 173 which forms a seal with the interior of the fitting body. The outer circumferential region terminates in a nose region 175. As can be seen in FIG. 9, the nose region receives a series of spaced gripping segments, such as segment 177.

As can be seen in FIG. 9, the gripping segment 177 has an outer sloping surface 179 which terminates in a downwardly sloping shoulder which forms a positive stop region 181. The stop region 181 continues to form an inner circumferential surface 183 which has two rows of gripping teeth 185, 187, formed thereon. The inner row of teeth 187 is slightly taller than the remaining rows of teeth. The resulting reduced total surface contact area allows the leading row of teeth to bite into a mating male pipe, even at low pipe pressures.

It will also be appreciated with respect to FIGS. 8 and 9 that each of the gripping segments 177 has a lower shelf region (189 in FIGS. 8 & 9) having lock regions formed therein which cooperate with mating portions of the resilient elastomeric material of the gasket body to mechanically secure the gripping segments to the gasket body. For example, in the version of the invention shown in FIG. 8, the lock regions comprise a series of openings in the form of holes or recesses 191 provided in the shelf region 189 of the gripping segments which communicate the inner and outer planar surfaces of the shelf region 189.

The locking action can be achieved in different ways. For example, during the injection molding process used to form the gasket body, rubber can be allowed to flow through the holes to mechanically attach the segments to the sealing portion of the gasket. In this way, the gripping segments are actually mechanically bonded to the gasket body. However, it will be appreciated that the elastomeric portion of the gasket body may have peg-like elements (shown as 192 in FIG. 8) which are formed in an injection molding step so that the gripping segments 177 can be removably positioned about the nose region of the gasket body with the peg-like elements engaging the openings 191 in the segments to engage the segments.

It will also be apparent from FIG. 8 that the gasket body has outwardly extending regions (such as region 176 in FIG. 8) which fill the space between the gripping segments 177, 178, 180. The rubber which fills the spaces between the gripping segments can be of the same composition as the rubber of the remaining gasket body. The Milometer of the rubber used will vary according to the end application but will generally have a Shore A hardness in the range from about 40 to 65, preferably about 55. This provides the gasket portion of the system to be flexible enough to be inserted into the mouth opening of the ductile iron fitting after the fitting has been manufactured. Because the spaces between the segments are filled with rubber, when the gasket body is compressed, the rubber inside the contained area essentially acts as a solid. This feature of the gasket body also helps to insure that, acting as a solid region around the circumference of the male pipe, the gripping system will not allow thinner wall PVC pipe to be overly compressed, possibly leading to a pipe failure as the pipe joint is assembled.

The number of the gripping segments 177, 178, 180 may vary depending upon the pipe diameter and other factors. For example, with the 8 inch diameter gasket shown in FIG. 8, there are six gripping segments equidistantly spaced about the nose region of the gasket and separated by six outwardly extending rubber regions (such as region 182 in FIG. 8).

As can be seen in FIG. 8, the outer circumferential regions 182 of the rubber regions 176 are slightly radially recessed with respect to the adjacent outer circumferential regions of the gripping segments on either side. It will also be appreciated from FIG. 8 that with respect to the central axis 184 of the gasket (and of the pipe mouth) that the gripping segments 178, 180, etc., are angled slightly inward in the direction of the central axis 184. As a result, the rows of gripping teeth (186 in FIG. 8) protrude past the rubber of the adjacent rubber regions on the I.D. of the gasket. It can also be seen from FIG. 8 that the positive stop regions 181 of the gripping segments extend slightly above the adjacent outmost extents (188 in FIG. 8) of the rubber regions. As viewed in FIG. 8, the outermost extents 188 are slightly taller than the stop regions 181 of the adjacent gripping segments.

Figure 10:
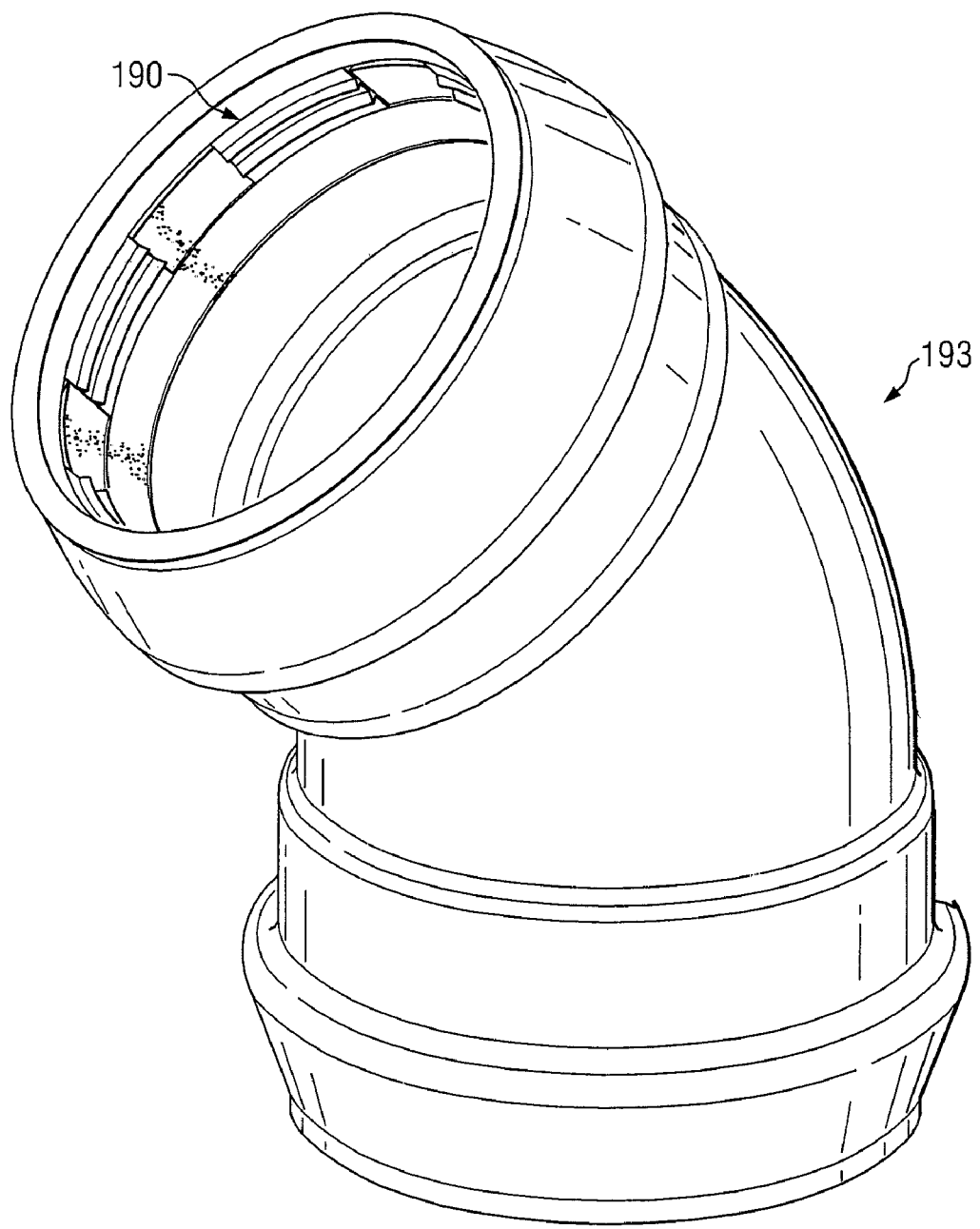
FIG. 10 is a perspective view of a ductile iron fitting shown with the sealing and restraint system of FIG. 8 present in the groove provided in the mouth region of the fitting.
Figure 11:
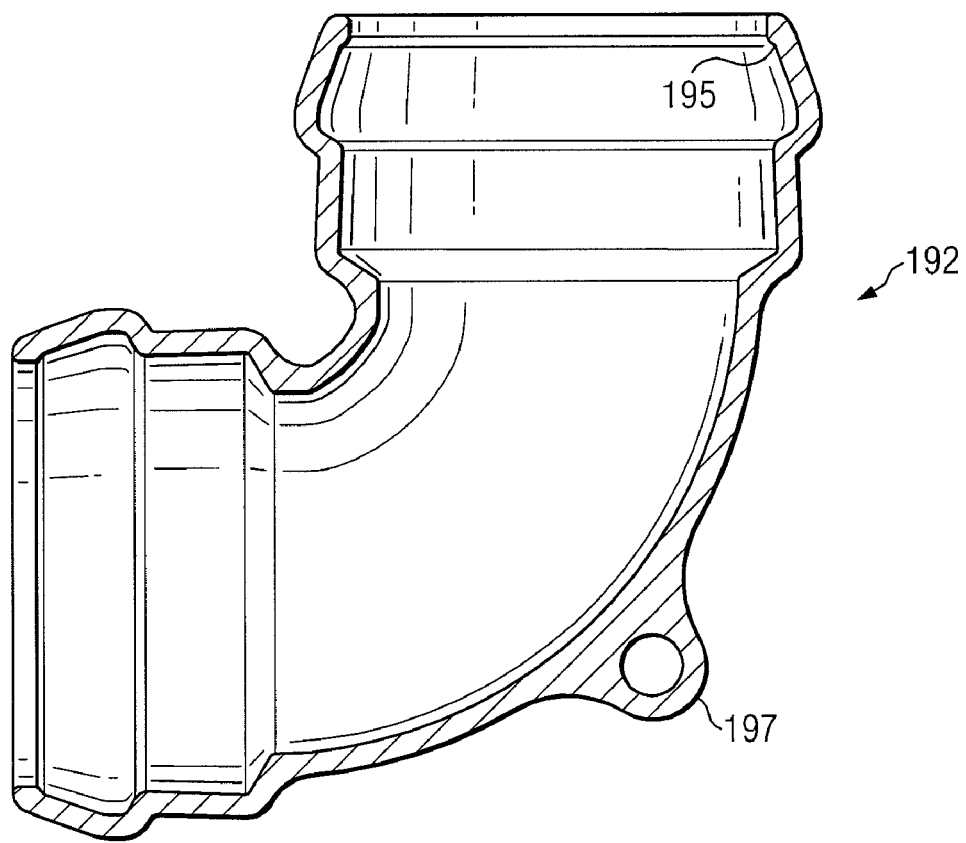
FIG. 11 is a side, cross-sectional view of a curved ductile iron fitting used with the sealing and restraint system of FIG. 8 showing the internal lip in the mouth region of the fitting.
Figure 12:
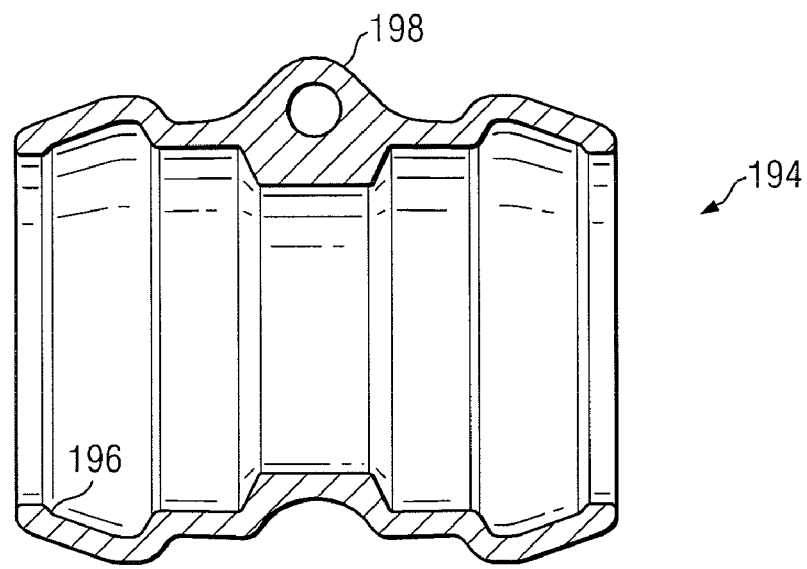
FIG. 12 is a side, cross-sectional view of a straight ductile iron fitting used with the sealing and restraint system of FIG. 8.

FIG. 10 shows a sealing and restraint system of FIGS. 8 and 9 (designated as 190) in FIG. 10) installed within the mouth region of a ductile iron fitting 193. FIGS. 11 and 12 are cross sectional views of a curved fitting (192 in FIG. 11) and a straight fitting (194 in FIG. 12). Turning to the cross-sectional view of the fitting 192 shown in FIG. 11, it will be appreciated that the mouth opening of the fitting is provided with a positive stop region 195 which is designed to contact the stop region 181 of the gripping segments (see FIG. 9 when it is installed within the fitting. The positive stop region 195 in the mouth of the fitting shown in FIG. 11 takes the form of an internal shoulder which forms an approximate 17-20 degree angle with respect to the mating surface formed by the stop regions 181 on the gripping teeth. Without the internal stop 195, the sealing and restraint mechanism could fail to properly engage on the exterior surface of the mating male pipe during make up of the joint. For example, under high pressure or water hammer conditions, the wedge mechanism on segments could over-compress the pipe causing permanent deformation of the pipe. A similar internal stop is shown as 196 in the mouth opening of the straight fitting 194 in FIG. 12.

The positive stop feature is especially important when the mating male pipe which is being installed within the ductile iron fitting is made of a plastic, such as PVC. In such a case, the positive stop between the fitting mouth and gripping segments will not allow the restraint system to over compress the PVC pipe, regardless of the pipe wall thickness or internal pressure in the pipeline.

Note also that in the embodiment of the fitting shown in FIGS. 11 and 12, the exterior of the fitting body is provided with a handling lug, such as lugs 197, 198. The handling lugs 197, 198 are especially useful on elbows and similar fitting components to assist the operator in installing the product. The lug is preferably located on the outside radius of the fitting body at an engineered location which is on the approximate centerline of the mouth openings of the pipe bell. The handling lugs allow the fittings with the sealing and restraint system of the invention to be pushed onto the mating male pipe, rather than being pulled on, as in the prior art. This also eliminates the need for the upset (47 in FIG. 1) present in the prior art fitting design.

The operation of the sealing and restraint system of the invention will now be briefly described. The system will typically be utilized with a fluid piping system which includes one or more as-cast ductile iron pipe fittings. With reference to FIG. 1, the as-cast fitting 39 typically requires no extensive modification from the item typically produced as-cast from the foundry with the exception of the provision of an internal stop region, as discussed with reference to FIG. 12. As mentioned earlier, it is not necessary for the upset (47 in FIG. 1) to be present or that any external shoulder be present for receiving connecting bolts since the internal restraint system of the invention replaces the prior art external components. The combination sealing and restraint system is then typically installed within the internal groove 49 provided within the mouth region 45 of the fitting after manufacture of the ductile iron fitting body. The sealing and restraint body (190 in FIG. 10) is installed within the annular groove provided in the mouth region of the fitting body so that the outer circumferential region forms a seal with the fitting mouth region and the inner circumferential region forms a sealing surface for a mating male pipe section.

As has been mentioned, the combination sealing gasket and gripping mechanism is inserted within the pipe mouth opening in a post cast operation, thus requiring the body to retain some degree of flexibility for ease of insertion. With respect to the version of the invention shown in FIGS. 8-10, this flexibility results in part from the spaced rubber regions 176 between the gripping segments.

Once the sealing and restraint gasket is in place, the mating male pipe is installed within the end opening of the mouth region of the as-cast fitting by pushing the male pipe within the end opening. Upon insertion of the male pipe end, the sealing and restraint system contacts the external surface of the mating male pipe in order to both seal and restrain the mating male pipe and form a secure pipe joint.

An invention has been provided with several advantages. The combination sealing and restraint system of the invention is capable of joining and sealing an as-cast ductile iron fitting to a mating male pipe section. The system of the invention is simple in design and economical to manufacture and does not require any drastic changes in existing ductile iron components. The present invention can be used to join ductile iron fittings to mating pipe sections without the need for external mechanical restraint components which complicate assembly and can be subject to corrosion or deterioration in use. By providing a mechanical lock between the gripping segments and the rubber of the gasket body, the gripping segments are more securely retained. Different size or designs of gripping segments can be swapped in and out of the same gasket body. This design also eliminates the need to use messy glues or other chemicals. The positive stop regions provided on the gripping segments and in the mouth region of the pipe bell allow the ultimate gripping force of the gripping teeth to be more effectively controlled where the mating male pipe is made of PVC. The same sealing and restraint system can be used with PVC, polyethylene and ductile iron pipe, depending upon the choice of materials for the component parts and with all available pipe sizes including, for example, metric, Imperial and IPS pipe sizes.

While the invention has been shown in several of its forms, it is not thus limited but is susceptible to various changes and modifications without departing from the spirit thereof.

We claim:

1. A combination sealing and restraint system for insertion within an annular groove provided within a mouth region located adjacent an end opening of a pipe fitting capable of both sealing and restraining the pipe fitting to a mating male pipe having an interior surface and an exterior surface, the sealing and restraint system comprising:

an annular gasket body made of a resilient elastomeric material, the annular gasket body having an inner circumferential region and an outer circumferential region which circumscribe a central axis of the gasket body, the annular gasket body being installed within the annular groove provided in the mouth region of the pipe fitting so that the outer circumferential region forms a seal with the fitting mouth region and the inner circumferential region forms a sealing surface for a mating male pipe;

a plurality of rigid gripping segments extending outwardly from the annular gasket body at an inclined angle with respect to a horizontal axis of the mouth region of the pipe fitting and at a predetermined spacing around the circumference of the annular gasket body;

wherein the gripping segments are comprised of an inner planar surface and an outer planar surface separated by a thickness, and wherein the inner planar surface has at least one row of gripping teeth capable of engaging selected points on the exterior surface of the mating male pipe and apply a gripping force to the exterior surface;

wherein the gripping segments are separated by flexible elastomeric extension regions of the gasket body, each of the gripping segments being provided with a shelf region at a base thereof, the shelf regions having lock regions formed therein which cooperate with mating portions of the resilient elastomeric material of the gasket body, whereby the gripping segments are mechanically secured to the gasket body;

wherein the outer circumferential region of the gasket body is formed by an alternating arrangement of the flexible elastomeric extension regions of the gasket body and the gripping segments, and wherein the flexible elastomeric extension regions are slightly radially recessed inwardly in the direction of the central axis of the gasket body and with respect to the adjacent outer circumferential regions of the gripping segments, and wherein the inner planar surfaces of the gripping segments protrude radially inward past the adjacent elastomeric extension regions in the direction of the central axis of the gasket body; and wherein the annular gasket body, when viewed in cross section, includes a leading nose region and a radially inwardly slanting sealing surface which forms a lip seal for engaging the mating male pipe end during insertion.

2. The combination sealing and restraint system of claim 1, wherein the gripping segments are formed of metal and are located at evenly spaced locations on the nose region of the gasket body, the segments being separated by regions of the elastomeric material of the gasket body.

3. The combination sealing and restraint system of claim 2, wherein the gasket body is injection molded and the gripping segments are integrally formed into the gasket body during the injection molding operation.

4. The combination sealing and restraint system of claim 3, wherein the gripping segments have a sloped exterior region which terminates in a downwardly extending shoulder which forms a positive stop for engaging a mating stop region formed in the mouth region of the fitting upon installation within the fitting.

5. The combination sealing and restraint system of claim 4, wherein the mating male pipe is made from a material selected from the group consisting of polyvinyl chloride, ductile iron, polyethylene and molecularly oriented plastics.

* * * * *